United States Patent Office 3,652,526
Patented Mar. 28, 1972

3,652,526
POLYMERIZATION PROCESS FOR VINYLIDENE
MONOMERS
Robert L. Bourget, North Wilbraham, and Nandlal S. Reejhsinghani, Springfield, Mass., assignors to Monsanto Company, St. Louis, Mo.
No Drawing. Filed Dec. 24, 1969, Ser. No. 888,086
Int. Cl. C08f 1/11, 3/30
U.S. Cl. 260—92.8 W        14 Claims

ABSTRACT OF THE DISCLOSURE

Vinylidene monomers are polymerized in a relatively short polymerization cycle utilizing a fast polymerization initiator and a substantially constant polymerization rate over a substantial portion thereof. Early in the cycle, the hourly rate of conversion is brought to about 26.0 to 35.0 percent and, to the point of termination of the reaction, it is maintained at a level not exceeding about 35.0 percent. The conversion rate is maintained substantially constant within the range specified until at least about 60.0 percent of the monomer is converted to polymer, and this is accomplished by controlling heat removal from the reaction and by incrementally adding initiator and water. The process has proven particularly advantageous for polymerizing vinyl chloride monomer formulations with acetyl sulfonyl peroxide initiators.

BACKGROUND OF THE INVENTION

Numerous techniques have been developed for effecting the batch polymerization of vinylidene monomers in aqueous suspension. It is generally most advantageous to carry reactions of this type to a relatively high degree of conversion in as short a period of time as possible not only because levels of productivity and profit margins are enhanced thereby but also because product quality can sometimes be improved as a result of such practices. Although the industry continually endeavors to minimize the reactor turn-around time and reaction cycle that are required, past attempts have met with only limited success; as a result, for example, suspension polymerization of vinyl halide monomer often requires a cycle time of at least about 6 hours and frequently periods considerably in excess thereof, depending in significant measure upon the initiator used, the ultimate level of conversion to be obtained, and the molecular weight and quality of product desired.

A number of highly active or "fast" polymerization initiators have been developed which permit reaction cycles to be completed in significantly reduced periods of time; however their use entails several practical problems, outstanding among which is that of providing the degree of heat transfer and temperature control necessary to provide safe operating conditions and to produce high quality products having the desired characteristics. One result of the need for increased heat transfer capacity is often a limitation upon the extent to which reactor volume can be utilized since the heat transfer surfaces and auxiliary equipment may not be adequate to control the reaction with fast initiators when the vessel is filled to capacity. Thus, the need exists for a process that not only requires shorter cycle times, but that also permits fuller utilization of equipment capacity without requiring complicated and expensive means for augmenting heat transfer capability.

Accordingly, it is an object of the present invention to provide a batch process for polymerizing vinylidene monomer formulations in aqueous suspension in which the time required to complete the polymerization cycle to a desired high level of monomer conversion is minimized without substantial detriment to product quality.

It is also an object to provide such a process in which highly active polymerization initiators can be used to full advantage with a minimum of attendant problems.

Another object is to provide such a process employing fast initiators, which can be effected conveniently and economically, and in which existing equipment can be employed more effectively and with a minimum amount of modification thereto.

SUMMARY OF THE INVENTION

It has now been found that the foregoing and related objects can be readily attained in a batch suspension polymerization process wherein an initial admixture comprising water, polymerizable vinylidene monomer and a fast polymerization initiator is agitated and maintained at a reaction temperature to effect the conversion to polymer of at least about 85.0 weight percent of monomer during a reaction cycle. The water and monomer are present in the initial admixture in a weight ratio of not more than about 1.3:1.0 and the initiator has a half life in dichloroethane of not more than about 2.5 hours, at the reaction temperature. The admixture is subjected to polymerization conditions to produce an hourly rate of conversion of about 26.0 to 35.0 percent, based upon the initial charge of monomer, at least by the point when about 25.0 percent of the monomer has been converted to polymer. Thereafter, the hourly rate of conversion is maintained at a level not exceeding about 35.0 percent to the point of termination of the reaction cycle, and it is maintained substantially constant at about the hourly rate level of 26.0 to 35.0 percent until at least about 60.0 percent of the monomer has been converted to polymer. This is accomplished by (a) controlling the removal of heat from the polymerizing admixture and (b) by introducing additional amounts of water and initiator on an incremental basis. The addition of initiator is completed at least by the point when conversion of about 75.0 percent of the monomer has occurred, and the addition of water provides a ratio of water to monomer plus polymer of at least about 1.4:1.0 at about 60.0 to 75.0 percent conversion of monomer to polymer.

In the preferred embodiments of the invention, the incremental introduction of initiator and water is commenced prior to the point when 25.0 percent of the monomer is converted to polymer, and the reaction cycle encompasses a period of not more than about 4.5 hours. Most desirably, the total conversion of monomer to polymer during the cycle exceeds about 90.0 percent, the hourly conversion rate is at least about 28.0 percent, and the reaction cycle encompasses a period of not more than about 4.0 hours. It is particularly beneficial to control the process so that during the portion of the cycle in which the conversion rate is maintained substantially constant at the hourly rate level designated, the conversion rate deviates by no more than about 3.0 percent per hour from the average value thereof occurring during that portion of the cycle; preferably, such deviation is less than 2.0 percent. The initiator is advantageously added to the initial admixture substantially continuously and at a decreasing rate, and the additions of water to the partially polymerized mixture are preferably at a rate approximating the rate of volumetric shrinkage therein. Most desirably the water is also added substantially continuously, and the reaction temperature is about 45.0° to 75.0° centigrade.

The initiator employed is preferably selected from the group consisting of alkyl peroxides and acetyl persulfonates, and may desirably be tertiary butyl peroxy pivalate, diisopropyl peroxydicarbonate, acetyl cyclohexane persulfonate and acetyl secondary heptyl persulfonate.

The initiator employed desirably has a half life of about 2.0 hours or less (under the same conditions as previously specified) and most desirably the half life is less than 1.5 hours; the previously-mentioned persulfonates are especially suitable.

DETAILED DESCRIPTION OF THE PREFERRED EMBODIMENTS

The reaction cycle

In a typical polymerization cycle, water, suspending agents and other additives are initially charged to the reaction vessel, followed by heating of the contents if necessary to a temperature somewhat above the desired reaction temperature and evacuation and purging of the vessel. Thereafter, the monomer or polymerizable monomer formulation (which may contain a preformed rubbery polymer for grafting), is admixed with the water and other components. Because the monomer is normally at a relatively low temperature it tends to lower the temperature of the admixture and thereby bring it to approximately the desired reaction temperature.

After all of the monomer is charged introduction of the initiator is begun, whereupon polymerization commences. The reacting mixture is agitated continuously to ensure homogeniety and to aid heat transfer to maintain the temperature and reaction rate within the desired ranges of values. However, it is important that the intensity of agitation not be so high as to result in a product containing unduly small particles of polymer, and the desired results can usually be achieved by optimizing the intensity of agitation and the suspending agent concentration and type. An agitative intensity value of about 15 to 17 will usually be appropriate in the present process, agitative intensity being an impirical expression developed by the Pfaudler Company, a division of Pfaudler-Permutit, Inc. of Rochester, N.Y., and described in Pfaudler Reprint No. 508, dated 1953 and entitled Development of Pfaudler Agitation by O. W. Green.

In a typical case, jacket cooling is employed until its capacity to maintain the desired reaction rate has been reached, whereupon reflux condenser cooling is applied by allowing water and monomer vapors to pass into a condenser wherein they are condensed by the extraction of heat therefrom and then returned to the polymerizing mass. During the course of the reaction, additional quantities of water and initiator are added to the reaction mixture, and after about 60 to 75 percent of the monomer has been converted the "heat kick" occurs. This is the point at which the reaction rate accelerates significantly, the pressure decreases and a temperature rise tends to occur (in the present process the temperature rise at heat kick is preferably controlled to limit it to about 3.0 centigrade degrees or less). Thereafter, the reaction is carried to substantial completion, by which is meant that at least 85 percent, and preferably at least 90 percent of monomer is converted to polymer.

As will be appreciated, the process will ideally be effected at the maximum rate that is consistent with the heat removal capabilities of the system and, in any case, during an intermediate portion of the reaction the polymerization rate should not fall below about 26.0 percent per hour, based upon the initial charge of monomer. It will be apparent that the higher the rate that can be maintained the shorter will be the reaction cycle, and thus the greater the benefits to be derived from the invention. However, too high a reaction rate will tend to make control very difficult and will also tend to reduce the total conversion that is attained when the reaction is substantially complete; accordingly, a reaction rate of about 35.0 percent per hour is considered to be a practical upper limit, which is not exceeded to the point of termination of the reaction. It will be appreciated that the time required for the cycle will depend upon the reaction rate which, in turn, will be determined by the initiator used, the monomer formulation, the reaction conditions, the reactor configuration, etc. Although in the preferred embodiments the cycle times are kept below about 4.5, and most desirably 4.0 hours, it should be understood that the primary value of the present invention resides in its capability of significantly reducing the time necessary to achieve a desired level of completion, and that therefore it is not appropriate to assign a maximum time for the process broadly disclosed.

As employed herein the terms "cycle" and "reaction time" are synonymous and define that period between the point at which the reaction commences by addition of initiator and the point at which conversion is substantially complete. The "turn around" time defines the entire period required for each polymerization batch, and includes the time necessary to charge the water, monomer, etc., to heat the mass and draw the vacuum, and the period used to effect the recovery of the product from the reaction vessel. Typically, the turn around time for the reactions described herein is about five or six hours, but this will depend somewhat upon the auxiliary equipment available such as to effect the charging of components and to effect recovery of product.

Of primary importance to the successful operation of the process described is the proper control of the water to monomer ratio ($W:M$), which term is used herein to include water to monomer plus polymer ratios, at stages during the reaction when some polymer is present. Although the initial water to monomer ratio does not appear to be so significant as is the final water to monomer weight ratio, it is important that it not exceed about 1.3:1.0. It is desirable to minimize the water to monomer ration at he outset since this permits a maximum utilization of available reactor volume for monomers, but the amount of water must at all times be sufficient to provide an acceptable viscosity in the reaction mixture and to allow adequate heat transfer. In some cases, the initial water to monomer ratio may be as low as 0.7:1.0, but normally it will be about 0.9 to 1.2:1.0.

A most significant aspect of the invention is the addition of water incrementally during the reaction at a rate sufficient to maintain adequate heat transfer and viscosity and to attain a final water to monomer weight ratio of at least about 1.4:1.0, preferably at least 1.45:1.0 and usually not greater than about 1.65:1.0. The final water to monomer ratio denotes the ratio that exists when the reaction is 60.0–75.0 percent complete in terms of monomer conversion, and not necessarily the ratio that exists when the reaction is substantially complete, i.e., at least about 85.0 percent converted. It may be desirable to introduce additional quantities of water after the "final" $W:M$ ratio has been attained at 60.0–75.0 percent conversion, but this is not essential to the effective operation of the invention. Terminating the water flow at about that point has the advantage of providing an available volume in the reactor into which a relatively large slug of water can be charged to "kill" a runaway reaction if necessary, or simply for additional control of the reaction. The upper limit of the ratio is a practical value based largely upon economic factors, since too much water restricts the quantity of polymer per batch that can be produced.

Most efficient operation in terms of maximum utilization of reactor volume can be attained by starting with a relatively low ratio of water to monomer and adding water at the rate of volumetric shrinkage in the reaction mass; such shrinkage occurs as a natural consequence of the polymerization reaction since the polymer is more dense than the monomer and therefore occupies less volume. By operating in this manner the reactor can be nearly completely filled at the outset, with additional quantities of water being added during the course of the cycle, thus maintaining suitable reaction conditions and yet making most efficient use of the reactor volume for polymer production. Minimizing the amount of water added has an additional beneficial effect in terms of obtaining optimum utilization of the initiator since kinetic effects generally tend to cause the reaction to proceed at higher rates when the mixture is more viscous.

The temperature at which the reaction is effected depends upon a numer of factors including the polymerizable monomers involved, the particular initiator employed, the desired molecular weight of the polymer produced, etc. For example, with the vinyl halide formulations the reaction temperature will normally lie between about 45.0° and 75.0° centigrade and preferably between about 50.0° and 70.0° centigrade. Operation at relatively high temperatures permts the less active catalysts to be employed and effectively increases the heat transfer capacity of the system since greater temperature differentials will exist. On the other hand, since the molecular weights of certain monomers (notably the vinyl halides) are particularly temperature sensitive, high temperature operation may sometimes be disadvantageous since it tends to produce low molecular weight products that are oftentimes less desirable than those of higher molecular weights. At too low a temperature the rates of reation and of heat transfer tend to become impractical.

As regards the manner in which the catalyst is charged it should be appreciated that the term "incrementally," as employed herein, is intended to include substantially continuous additions of material; this is also true with respect to the introduction of water. Although in the ideal case the catalyst is added continuously to provide a very smooth reaction, as a practical matter it is difficult to design equipment for introducing the catalyst in carefully controlled amounts in a continuous fashion, so in many cases the catalyst will be added in discrete charges, albeit with some slight disruption of the continuity of the reaction profile. Generally, a relatively large charge of catalysts will be introduced initially, followed by a number of progressively smaller charges, the amount of which should be carefully controlled to maintain the desired reaction rate. Subsequent charges of initiator are most desirably made after the point at which the desired substantially constant conversion rate has been reached; additional initiator may (and normally will) also be introduced prior to that point. In any event it is quite important that the addition of initiator be completed at least by the point when about 75.0 percent of the monomer has been converted, so that further amounts of initiator are not added during the finishing portion of the cycle.

The polymerization initiators

As has been indicated, the present invention entails the use of particularly active or fast initiators which significantly reduce the expense of the process by making the most efficient use of available facilities. The initiator may be added as a preformed compound, or it may be generated in situ by the reaction of suitable components. The terminology "introduction of initiator" is intended to encompass addition of the preformed compound or of one or more reactants to generate the initiator. Suitable initiators include any free radical initiator having a half life of less than about 2.5 hours, and preferably less than about 2.0 hours, at the termperature of reaction as determined by the decomposition rate of a 0.025 mol per liter solution thereof in 1,2-dichloroethane.

Particularly effective initiators are the acetyl persulfonates of the type described by Beer et al. in U.S. Pat. No. 3,340,243, such as acetyl cyclohexane persulfonate and acetyl secondary heptyl persulfonate. A second class of initiators that is desirably employed herein consists of the mono- and di-alkyl substituted peroxides, exemplified respectively by tertiary butyl peroxy pivalate and diisopropyl peroxydicarbonate. Symmetrical azo compounds such as azo-bis-isobutyronitrile may also be used herein as may be other compounds that are suitable for the monomer system and satisfy the specified half life requirement.

It is possible to employ a combination of initiators wherein one or more of the fast initiators as defined herein is ultilized in conjunction with a relatively slow catalyst or initiator that has a half life higher than the specified maximum. Although the entire charge of such a slow initiator will usually be introduced at the commencement of the cycle, it may be added thereafter, and the use of such a combination may improve reaction control as well as maintain a catalyzed reaction practically to the end of the cycle with little or no undesirable residues remaining in the reaction mass thereafter. However, optimization of the reaction rate and initiator utilization will usually require that only fast initiators be employed, since one of the significant advantages of the present process is that only very small quantities thereof are required.

Molar amounts of initiator ranging from about 0.001 to 0.1 percent, based upon the moles of polymerizable monomers present, are suitable, and preferably the amount thereof will be about 0.01 to 0.03 percent. Most desirably, the amount of initiator used will be about 0.015 to 0.024 percent of the moles of polymerizable monomers since this level of concentration ensures good control of the reaction and provides most efficient utilization of initiator.

The vinylidene monomer formulation

Although the process may be employed to polymerize any of the types of vinylidene monomers or combination thereof for which suspension processes are generally suitable, the vinyl halides are particularly adapted to polymerization in suspension and are considered to be the monomers with which the present process is most advantageously employed. Both vinyl chloride and vinyl fluoride may be employed as the vinylidene monomer, but the preferred compound is vinyl chloride and it will frequently provide the entire amount of polymerizable monomer. However, other ethylenically unsaturated monomers may be copolymerized therewith; the amount thereof should not exceed about 25.0 percent by weight of the monomer formulation, and preferably it will be less than about 15.0 weight percent thereof. Exemplary of such ethylenically unsaturated copolymerizable monomers are the vinyl esters of organic acids such as vinyl acetate; vinylidene halides such as vinylidene chloride; unsaturated nitriles such as acrylonitrile; (alk)acrylate esters such as methyl methacrylate; maleates; fumarates; and the like.

Monovinylidene aromatic hydrocarbons are also readily polymerizable by the present process, and such monomers may be homopolymerized or interpolymerized with each other or with monomers of other types. For example, styrene may be interpolymerized with ring-substituted alkyl styrenes, ring substituted halo-styrenes, ring-alkyl, ring-halo-substituted styrenes, vinyl naphthalene, vinyl anthracene, etc. In alkyl-substituted monomers, the alkyl substituents generally have one to four carbon atoms and may comprise isopropyl or isobutyl groups.

Exemplary of other vinylidene monomers that can be employed as the basic monomers in this process or interpolymerized with monovinylidene aromatic hydrocarbons are ethylenically unsaturated nitriles (particularly acrylonitrile and methacrylonitrile), alpha- or beta-unsaturated monobasic acids and derivatives thereof (such as acrylic and methacrylic acids and esters), vinyl esters (such as vinyl acetate, vinyl propionate), dialkyl maleates and fumarates, etc. As is known in the art, the amounts of these comonomers suitably included in an interpolymer will vary, and it will be understood that it is within the scope of the present invention to homopolymerize many of the foregoing monomers or interpolymerize in numerous combinations thereof.

Furthermore, it may be desired to include in the monomer formulation up to about 15.0 percent by weight thereof of a preformed rubbery polymer onto which at least a portion of the polymerizable monomers may be grafted, and preferably the amount of rubbery polymer will not exceed 10 percent of the weight of the monomer formulation. Rubbery polymers conventionally used for this purpose include olefinic compounds such as polyethylene, chlorinated polyethylene, chlorosulfonated polyethylene, ethylene/acrylate copolymers, ethylene/propylene copolymers, ethylene/propylene/diene terpolymers, ethylene/vinyl acetate copolymers, natural rubbers, polyisoprene rubbers, acrylate rubbers, etc., and, mixtures thereof. The unsaturated rubbers such as the dienes may be less desirable with certain monomers (such as the vinyl halides) because of the adverse effect which they tend to have upon the rate of polymerization thereof. The rubbery polymer most appropriate for use in a given instance will depend upon the specific monomer or monomers involved, and the choice thereof will be readily apparent to those skilled in the art.

Suspending agents and other additives

To maintain the polymerizable monomer formulation in suspension during the reaction, any of the suspension stabilizers commonly employed for the monomer involved may be adopted for the present process. For example, suitable agents include the partially hydrolyzed polyvinyl acetates (i.e., polyvinyl alcohols preferably having a residual acetate content of about 15.0 to 45.0 weight percent) and the various saponification products thereof, maleic acid copolymers, gelatin, and various cellulose derivatives (particularly the esters thereof such as methyl cellulose, ethyl cellulose, hydroxypropyl methyl cellulose, hydroxyethyl cellulose). Various mixtures of the foregoing and/or other types of suspending agents may also be utilized, and it is ofen beneficial to employ such a suspending agent along with a secondary dispersant, such as the fatty acid esters containing 12 to 18 carbon atoms in the ester chain (exemplified by sorbitan esters). Combination suspending agent systems based upon partially hydrolyzed polyvinyl acetates are advantageously employed.

Other types of additives may also be included in the polymerization mixture for various reasons. For example, a small amount of a heat stabilizer such as 2,6-ditertiarybutyl p-cresol may be admixed therewith prior to polymerization, and additives designed to modify the product characteristics, such as trichloroethylene for molecular weight control, may be used. The present polymerization mixtures may, in addition, contain other additives conventionally included in mixtures of the same type, and some materials, such as solvents and the like, may be introduced incidentally and retained in the product without detriment. For example, diisopropyl peroxydicarbonate is frequently sold in a solvent of diethyl maleate; since this solvent can be cross linked to become an integral part of the polymer its presence will not normally have an adverse effect thereupon.

Exemplary of the efficacy of the present invention is the following specific example, wherein all parts and percentages are on a weight basis unless specified otherwise.

Example one

Into an agitated, jacketed reaction vesel fitted with a reflux condenser and having means for injecting water and catalyst, are charged 115.0 parts of water, a small, effective amount of a partially hydrolyzed polyvinyl alcohol suspending agent formulation, and a small amount of 2,6-ditertiarybutyl p-cresol. The resulting admixture is heated to about 58.0° to 60.0° centigrade, following which a vacuum of about 22 to 24 inches of mercury is drawn to evacuate the vessel. Then 100.0 parts of vinyl chloride monomer at about 5.0° to 15.0° centigrade are introduced, whereupon the resulting admixture has a temperature of about 54.0° There is then added an initial charge of initiator comprising a 29 weight percent solution of acetyl cyclohexane persulfonate in dimethyl phthalate, which charge constitutes 0.0045 mole percent of initiator, based upon the vinyl chloride monomer. Upon introduction of the first quantity of initiator, which in this case has a half life in dichloroethane of about 1.1 hours at 54.0° centigrade, polymerization commences; thereafter, the remainder of the initiator charge is added according to the schedule in Table One to provide a total charge of about 0.018 mole percent.

TABLE ONE

| Cycle time [1]: | Mole percent of initiator $\times 10^3$ (based on monomer) |
|---|---|
| 20 | 3.96 |
| 35 | 3.60 |
| 50 | 1.08 |
| 65 | 1.08 |
| 80 | 1.08 |
| 95 | 1.08 |
| 110 | 0.54 |
| 125 | 0.54 |
| 140 | 0.54 |

[1] Minutes after initial initiator charge.

Approximately ten minutes after polymerization commences, water is introduced into the reaction vessel on a continuous basis but at varying rates. The polymerization rate is monitored with a B.t.u. meter (since the heat evolved is directly proportional to the rate of reaction) and the water is charged at a rate that is directly proportional to the rate of reaction to approximate the volumetric shrinkage due to polymer formation. The charging of water in this manner is continued until about 77.0 percent of the monomer is converted, at which point the ratio of water to monomer plus polymer is about 1.45:1.0 and after which the free space in the vessel is allowed to increase. The water to monomer plus polymer weight ratio at the point of 65.0 percent conversion is about 1.40:1.0.

About 1¼ hours after the first charge of initiator is added, approximately 20 percent of the monomer is converted to polymer and an hourly conversion rate of about 27 percent is attained; also at that point about 85 percent of the total charge of initiator has been introduced. A total conversion of about 65 to 70 percent of the monomer is achieved by the end of the next period of about 1½ to 1¾ hours, during which period the reaction rate is maintained at a substantially constant value of 28 percent per hour. After this period (i.e., at about 3 to 3¼ hours into the cycle) the "heat kick," which is evidenced by a fairly rapid increase in reaction rate, occurs. Then the reaction rate starts to fall and thereafter falls rapidly to the end of the cycle, which is terminated about four hours after the commencement thereof, with a total conversion of more than 90 percent having been attained.

Throughout the cycle agitation is maintained at an agitative intensity value of about 15 (equivalent under the existing conditions and with the equipment used to about 135 r.p.m.), and the temperature is controlled to a fairly constant value of about 54.0° centigrade. Temperature and reaction rate control is achieved through both jacket and condenser reflux cooling effects, the reflux condenser being cut-in to operate in conjunction with the jacket cooling effect when the capacity of the latter is reached.

The polyvinyl chloride product is recovered in a conventional manner and evaluated, as a result of which it is found to be of substantailly equivalent quality to comparable resins prepared at about the same temperature by more conventional methods requiring significantly longer cycle times. In some specific cases, cycle times have been reduced, as a result of employing the features of the present invention, by about 7 to 10 percent.

Thus, it can be seen that the present invention provides a batch process for polymerizing vinylidene monomer formulations in aqueous suspension, in which the time required to complete the polymerization cycle is minimized without substantial detriment to product quality. Highly active polymerization initiators are used in the process to full advantage with a minimum of attendant problems, and the process can be carried out conveniently and economically, effectively utilizing existing equipment with little or no modification thereof.

What is claimed is:

1. In a batch suspension polymerization process wherein an initial admixture comprising water, polymerizable vinylidene monomer formulation, and fast polymerization initiator is agitated and maintained at a reaction temperature to effect the conversion to polymer of at least about 85.0 percent by weight of polymerizable monomer in said formulation during a reaction cycle, said water and monomer being present in said initial admixture in a weight ratio of not more than about 1.3:1.0 and said initiator having a half life in 1,2-dichloroethane at said reaction temperature of not more than about 2.5 hours, the improvement comprising subjecting the admixture to polymerization conditions including a preselected temperature within the range of 45–75° centigrade to produce an hourly rate of conversion of about 26.0 to 35.0 percent, based upon the initial charge of monomer, at least by the point when about 25.0 percent of said monomer has been converted to polymer; and thereafter maintaining the hourly rate of conversion at a level not exceeding about 35.0 percent to the point of termination of the reaction cycle and substantially constant at about said hourly rate level of 26.0 to 35.0 percent until at least about 60.0 percent of said monomer has been converted to polymer by (a) controlling the removal of heat from the polymerizing admixture by indirect heat exchange and by reflux cooling of vaporized monomers to maintain the temperature of the polymerizing admixture at about said preselected temperature within the range of 45–75° centigrade and (b) introducing additional amounts of water and initiator on an incremental basis, the addition of initiator being completed at least by the point when conversion of about 75.0 percent of the monomer has occured and the total initiator comprising 0.001–0.1 mole percent, based upon moles of polymerizable monomer, and the addition of water facilitating heat transfer providing a ratio of water to monomer plus polymer of at least about 1.4:1.0 at about 60.0 to 75.0 percent conversion of monomer to polymer, said reaction cycle employing a period of not more than 4.5 hours to effect conversion of at least 85.0 weight percent of the total polymerizable monomer in the formulation.

2. The process of claim 1 wherein the incremental introduction of initiator and water is commenced prior to the point when 25.0 percent of said monomer is converted to polymer.

3. The process of claim 1 wherein said hourly conversion rate is at least about 28.0 percent and wherein said reaction cycle encompasses a period of not more than about 4.0 hours.

4. The process of claim 3 wherein during the portion of said cycle in which said conversion rate is maintained substantially constant at about said hourly rate level, said conversion rate deviates by no more than about 3.0 percent from the average value thereof occurring during said portion of said cycle.

5. The process of claim 2 wherein initiator is added to said initial admixture substantially continuously and at a generally decreased rate.

6. The process of claim 1 wherein water is added to the partially polymerized admixture at a rate approximately the rate of volumeric shrinkage of the monomer/polymer mixture due to the conversion of monomer to polymer therein.

7. The process of claim 2 wherein water is added substantially continuously.

8. The process of claim 1 wherein said conversion of monomer to polymer during said reaction cycle exceeds about 90.0 percent.

9. The process of claim 1 wherein said initiator is selected from the group consisting of alkyl peroxides and acetyl persulfonates.

10. The process of claim 9 wherein said initiator is selected from the group consisting of tertiary butyl peroxypivalate, diisopropyl peroxy dicarbonate, acetyl cyclohexane persulfonate and acetyl secondary heptyl persulfonate.

11. The process of claim 1 wherein said half life is about 2.0 hours or less.

12. The process of claim 10 wherein said initiator is selected from the group consisting of acetyl cyclohexane persulfonate and acetyl secondary heptyl persulfonate.

13. The process of claim 1 wherein at least about 75.0 weight percent of said monomer formulation is provided by vinyl chloride, and wherein said reaction temperature is about 50.0 to 70.0° centigrade.

14. The process of claim 1 wherein there is included in said initial admixture a second initiator having a half-life longer than 2.5 hours at said reaction temperature.

References Cited

UNITED STATES PATENTS

| 2,975,162 | 4/1961 | Iloff | 260—92.8 W |
| 3,022,282 | 2/1962 | Marous et al. | 260—92.8 W |
| 3,451,985 | 6/1969 | Mahlo | 260—92.8 W |

FOREIGN PATENTS

| 1,385,374 | 3/1965 | France | 260—92.8 W |

JOSEPH L. SCHOFER, Primary Examiner

J. A. DONAHUE, JR., Assistant Examiner

U.S. Cl. X.R.

260—85.5 XA, 85.5 HC, 86.7, 87.1, 87.5 R, 88.7 R, 89.1 R, 89.3, 78.5 CI, 91.5, 91.7, 93.5 W, 93.5 C, 875, 878, 879